US009952046B1

(12) United States Patent
Blacutt et al.

(10) Patent No.: US 9,952,046 B1
(45) Date of Patent: Apr. 24, 2018

(54) CELLULAR PHONE AND PERSONAL PROTECTIVE EQUIPMENT USAGE MONITORING SYSTEM

(75) Inventors: Sergio Blacutt, Tucson, AZ (US); Daniel Flores, Tucson, AZ (US); Ruben Flores, Oro Valley, AZ (US); Miguel Soto, Tucson, AZ (US)

(73) Assignee: GUARDVANT, INC., Tucson, AZ (US)

( * ) Notice: Subject to any disclaimer, the term of this patent is extended or adjusted under 35 U.S.C. 154(b) by 734 days.

(21) Appl. No.: 13/397,393

(22) Filed: Feb. 15, 2012
(Under 37 CFR 1.47)

Related U.S. Application Data

(60) Provisional application No. 61/443,116, filed on Feb. 15, 2011.

(51) Int. Cl.
*H04N 7/18* (2006.01)
*G01C 11/02* (2006.01)
*H04N 3/08* (2006.01)
*G03B 15/00* (2006.01)
*H04N 7/00* (2011.01)

(52) U.S. Cl.
CPC ............ *G01C 11/025* (2013.01); *G03B 15/00* (2013.01); *H04N 3/08* (2013.01); *H04N 7/005* (2013.01)

(58) Field of Classification Search
USPC .......................................... 348/113–118, 148
See application file for complete search history.

(56) References Cited

U.S. PATENT DOCUMENTS

| 5,023,597 A | 6/1991 | Salisbury ...................... 340/572 |
| 5,051,906 A | 9/1991 | Evans et al. .................... 701/28 |
| 5,109,425 A | 4/1992 | Lawton ......................... 382/107 |
| 5,155,684 A | 10/1992 | Burke et al. ..................... 701/25 |
| 5,164,707 A | 11/1992 | Rasmussen et al. .......... 340/572 |
| 5,220,508 A | 6/1993 | Ninomiya et al. ............. 701/523 |
| 5,307,419 A | 4/1994 | Tsujino et al. ................. 382/153 |
| 5,310,248 A | 5/1994 | King et al. ..................... 299/1.1 |
| 5,530,330 A | 6/1996 | Baiden et al. ................. 318/580 |
| 5,610,815 A | 3/1997 | Gudat et al. .................... 701/23 |
| 5,745,038 A | 4/1998 | Vance ........................... 340/575 |
| 5,745,869 A | 4/1998 | van Bezooijen ............... 701/513 |
| 5,867,587 A | 2/1999 | Aboutalib et al. ............ 382/117 |

(Continued)

OTHER PUBLICATIONS

Office Action issued in related U.S. Appl. No. 13/397,455, dated Sep. 12, 2014 (20 pgs).

(Continued)

*Primary Examiner* — Christopher S Kelley
*Assistant Examiner* — Asmamaw Tarko
(74) *Attorney, Agent, or Firm* — Hayes Soloway PC

(57) ABSTRACT

A cellular phone and personal protective equipment usage system comprises a camera for detecting a person within an environment and a processor which receives information detected by the camera and determines whether the person is involved in distracting activities such as using a cellular phone or other portable electronic device, or print media, or is using personal protective equipment, and issues an alarm signal upon determining that the person is using a cellular phone or is not using personal protective equipment. The camera may be provided on or within a vehicle and the person is an operator of the vehicle. Alternatively, the camera may be mounted in a stationary location within a working site.

18 Claims, 1 Drawing Sheet

(56) References Cited

U.S. PATENT DOCUMENTS

| | | | |
|---|---|---|---|
| 5,923,027 A | 7/1999 | Stam ................................ 15/15 |
| 5,999,865 A | 12/1999 | Bloomquist et al. ........... 701/25 |
| 6,151,539 A | 11/2000 | Bergholz et al. ............... 701/25 |
| 6,154,123 A | 11/2000 | Kleinberg ..................... 340/436 |
| 6,163,745 A | 12/2000 | Purchase et al. ............... 701/23 |
| 6,296,317 B1 | 10/2001 | Ollis et al. ..................... 299/1.4 |
| 6,346,887 B1 | 2/2002 | Van Orden et al. .......... 340/575 |
| 6,616,244 B2 | 9/2003 | Hakkinen ..................... 299/1.05 |
| 6,678,590 B1 | 1/2004 | Burchfiel ....................... 701/28 |
| 6,792,147 B1 | 9/2004 | Saka et al. .................... 382/199 |
| 6,873,286 B2* | 3/2005 | Albero et al. ................... 342/71 |
| 7,138,923 B2 | 11/2006 | Ferrone et al. ............... 340/576 |
| 7,171,285 B2 | 1/2007 | Kim et al. ..................... 700/245 |
| 7,466,223 B2 | 12/2008 | Sefton ........................... 340/521 |
| 7,602,947 B1 | 10/2009 | Lemelson et al. ............ 382/116 |
| 7,616,125 B2 | 11/2009 | Johns ............................ 340/576 |
| 7,643,685 B2 | 1/2010 | Miller ........................... 382/209 |
| 7,656,277 B2 | 2/2010 | Kawasaki ................... 340/425.5 |
| 7,693,629 B2 | 4/2010 | Kawasaki ....................... 701/36 |
| 7,725,232 B2 | 5/2010 | Makela et al. .................. 701/50 |
| 7,865,285 B2 | 1/2011 | Price et al. ...................... 701/50 |
| 8,019,536 B2 | 9/2011 | McQuaide, Jr. .............. 701/411 |
| 8,351,684 B2 | 1/2013 | Clar et al. ..................... 382/154 |
| 8,686,864 B2* | 4/2014 | Hannon ........................ 340/576 |
| 2003/0181822 A1* | 9/2003 | Victor ........................... 600/558 |
| 2004/0090334 A1 | 5/2004 | Zhang et al. ................. 340/575 |
| 2004/0155811 A1* | 8/2004 | Albero et al. ................... 342/70 |
| 2004/0209594 A1 | 10/2004 | Naboulsi ..................... 455/404.1 |
| 2007/0115357 A1 | 5/2007 | Stein et al. ................... 348/148 |
| 2007/0198174 A1 | 8/2007 | Williams ...................... 701/202 |
| 2007/0262574 A1* | 11/2007 | Breed ....................... B60R 1/00 280/735 |
| 2007/0286457 A1* | 12/2007 | Hammoud et al. ........... 382/103 |
| 2008/0024611 A1* | 1/2008 | Konishi ........................ 348/180 |
| 2008/0154495 A1 | 6/2008 | Breed ........................... 701/208 |
| 2008/0316328 A1 | 12/2008 | Steinberg ..................... 348/222.1 |
| 2008/0317357 A1 | 12/2008 | Steinberg ..................... 382/209 |
| 2008/0317378 A1 | 12/2008 | Steinberg ..................... 382/275 |
| 2008/0317379 A1 | 12/2008 | Steinberg ..................... 382/275 |
| 2009/0037059 A1 | 2/2009 | Huster et al. ................... 701/50 |
| 2009/0256910 A1 | 10/2009 | Ganeshan .................... 348/148 |
| 2009/0316012 A1 | 12/2009 | Matos ....................... 348/208.14 |
| 2010/0033333 A1* | 2/2010 | Victor et al. .................. 340/576 |
| 2010/0148920 A1* | 6/2010 | Philmon et al. ............... 340/5.2 |
| 2010/0219955 A1 | 9/2010 | Demirdjian et al. ......... 340/575 |
| 2011/0102167 A1 | 5/2011 | Baur et al. .................... 340/439 |
| 2011/0128163 A1 | 6/2011 | Gilleland .................... 340/988 |
| 2011/0169626 A1* | 7/2011 | Sun et al. ..................... 340/439 |
| 2011/0183601 A1* | 7/2011 | Hannon ........................... 455/1 |
| 2011/0266360 A1 | 11/2011 | Gudat ............................ 239/11 |
| 2011/0284304 A1* | 11/2011 | Van Schoiack ............... 180/272 |
| 2011/0288769 A1 | 11/2011 | Gudat ........................... 701/532 |
| 2012/0146789 A1* | 6/2012 | De Luca et al. ............. 340/540 |
| 2012/0162428 A1 | 6/2012 | Wee .............................. 348/148 |
| 2012/0283894 A1* | 11/2012 | Naboulsi .......................... 701/1 |
| 2013/0141578 A1 | 6/2013 | Chundrlik, Jr. et al. ...... 348/148 |
| 2013/0282609 A1* | 10/2013 | Au et al. ....................... 705/325 |
| 2014/0159887 A1 | 6/2014 | Piasecki et al. .............. 340/438 |
| 2014/0232869 A1 | 8/2014 | May et al. .................... 348/148 |

OTHER PUBLICATIONS

Office Action Issued in corresponding U.S. Appl. No. 13/397,467 dated May 31, 2013 (12 pgs).
Office Action issued in related U.S. Appl. No. 13/397,455, dated Jan. 23, 2015 (15 pgs).
Office Action issued in related U.S. Appl. No. 13/397,410, dated Feb. 13, 2015 (22 pgs).
Eye-Com Corporation in cooperation with the US Dept. of Defense and the US Dept. of Transportation, "The PERCLOS Measure is a Reliable Indicator of Driver Drowsiness and Fatigue," second of a series of five posts (3 pgs).
Office Action issued in related U.S. Appl. No. 13/397,410, dated Oct. 6, 2014 (27 pgs).
Office Action issued in related U.S. Appl. No. 13/397,467, dated Oct. 17, 2013 (11 pgs).
Office Action issued in related U.S. Appl. No. 13/397,467, dated Jan. 22, 1014 (9 pgs).
Office Action issued in related U.S. Appl. No. 13/397,467, dated May 15, 2014 (13 pgs).
Office Action issued in related U.S. Appl. No. 13/397,455, dated Oct. 3, 2014 (7 pgs).
Reed et al., "Evaluation of dust exposure to truck drivers following the lead haul truck," NIOSHTIC-2 No. 20026390, Feb. 2005 (2 pgs); summary/abstract only.
Senaratne et al., "Driver Fatigue Detection by Fusing Multiple Cues," Computer Science, 2007, vol. 4492/2007, pp. 801-809 (abstract and fulltext preview only).
Official Action issued in related U.S. Appl. No. 13/397,455, dated Oct. 8, 2015 (25 pgs).
Notice of Allowance issued in U.S. Appl. No. 13/397,410, dated Aug. 3, 2015 (9 pgs).
U.S. Appl. No. 13/397,410, filing date Feb. 15, 2012.
U.S. Appl. No. 13/397,467, filing date Feb. 15, 2012.
U.S. Appl. No. 13/397,455, filing date Feb. 15, 2012.
U.S. Appl. No. 13/397,410, filing date Feb. 15, 2012, Blacutt et al.
U.S. Appl. No. 13/397,455, filing date Feb. 15, 2012, Blacutt et al.

* cited by examiner

CELLULAR PHONE AND PERSONAL PROTECTIVE EQUIPMENT USAGE MONITORING SYSTEM

CROSS REFERENCE TO RELATED APPLICATION

This application claims benefit of U.S. Provisional Application Ser. No. 61/443,116, filed Feb. 15, 2011.

FIELD OF THE INVENTION

The present invention relates to a cellular phone and personal protective equipment usage monitoring system and method that detects a person within an environment, such as a vehicle, and determines if that person is involved in distracting activities such as using a cellular phone or other portable electronic device and/or is or is not using personal protective equipment. The present invention can further determine whether a person is engaged in other unsafe activities, including the use of various types of print media, such as reading a magazine, book or newspaper, or doing a crossword puzzle. Image information detected by the camera may be compared with prerecorded images of cellular phones, other portable electronic devices and print media, or of personal protective equipment, that is stored in computer readable memory and the determination of whether the person is using a cellular phone and/or is or is not using personal protective equipment may be based on the comparison. An alarm signal may be issued if it has determined that the person is using a cellular phone and/or is or is not using personal protective equipment. The invention has particular utility in connection with working operations, such as a mining operation, where the use of a cellular phone and/or the lack of use of proper personal protective equipment is dangerous and may lead to property damage, injury and even loss of human life. The invention will be described in connection with such utility, although other utilities are contemplated.

BACKGROUND OF THE INVENTION

It is a well known problem that operators of a wide range of vehicles often use cellular phones while operating the vehicle. Whether using a cellular phone to have a voice conversation, to compose a text message or to surf the Internet, such use while operating a vehicle is a distraction to the vehicle operator and dramatically increases the risk of property damage, injury and even loss of human life. Other distracting activities, such as using a portable electronic device or print media, pose similar risks. As used herein, the term "print media" generally refers to any printed material, including books, magazines, newspapers, crossword puzzles and the like. "Portable electronic device" includes all portable electronic devices as are known in the relevant art, including communication devices, video game devices, portable audio and video media players and laptops and other portable computers. In certain operations, such as an underground or open pit mining operation, where vehicles operate within an environment including other vehicles, humans and/or other objects in close proximity, the risk of damage and injury is heightened. In order to minimize capital losses and injuries, as well as to monitor generally the overall safety and performance of the operation, it is desirable to be able to monitor vehicle operators, detect the usage of a cellular phone or other electronic device, as well as the improper use of various print media, and warn the vehicle operator and operation supervisors so the unsafe activity will be terminated. Moreover, it is desirable to be able to monitor the entire working site, not just vehicle operators, so that distracting and unsafe activity may be detected.

Additionally, the use of personal protective equipment should be used, and may be required to be used, in certain working environments. For example, in a mining operation, many different types of personal protective equipment may be used for worker safety, for vehicle operators and for other personnel. Some examples of personal protective equipment include indicating equipment (toxic gas and oxygen indicators, combustible gas indicators, etc.), respirators, protective clothing, hard hats and other head protection, eye and face protection and hearing protection equipment. When a worker fails to use the appropriate protective equipment in a working site, that person jeopardizes his or her own safety, the safety of others, as well as the overall efficiency of the operation. Thus, it is desirable to be able to monitor if a worker is involved in distracting activities such as the usage of personal protective equipment, as well as the usage of cellular phones or other electronic devices, and the improper use of various types of print media.

U.S. Pat. No. 5,023,597 discloses an apparatus for detecting the use of safety eyewear. An infrared transmitter is provided in an entryway that workers pass through. Workers wear the safety eyewear, which is equipped with an infrared reflector. When a worker wearing the safety glasses passes through the entryway, the safety glasses are detected as infrared light from a transmitter in the entryway is reflected off of the infrared reflector on the glasses and is received by a receiver in the entryway. However, the apparatus only works within an entryway, and requires the installation of an infrared reflector on the safety glasses. U.S. Pat. No. 5,164,707 similarly discloses a safety equipment detection system that requires an infrared reflector affixed to the safety equipment.

Facial recognition systems are also known in the prior art. For example, U.S. Pat. No. 7,602,947 discloses a facial recognition system used for vehicle security. The system uses an infrared camera directed at the face of a person in the driver's seat of a vehicle and enables operation of the vehicle if facial images detected by the camera match facial images stored in a database.

However, there is a need in the field for a cellular phone and personal protective equipment usage system that is capable of determining whether a vehicle operator is involved in distracting activities such as using a cellular phone or other portable electronic device, print media and/or personal protective equipment, and alerting the vehicle operator, as well as office or field supervisors, if a cellular phone or other electronic device or print media is being used or if the appropriate personal protective equipment is not being used. Moreover, there is a need in the field for such a system that can detect the use of a cellular phone or other portable electronic device, print media and/or personal protective equipment by persons other than a vehicle driver. The detection of cellular phone or other portable electronic device, print media and/or personal protective equipment and alerting the vehicle driver and supervisors fosters a safer working environment, and enables supervisors to more closely monitor the safety of the working environment as a whole.

SUMMARY OF THE INVENTION

The present disclosure is directed to a cellular phone and personal protective equipment usage monitoring system and method. More particularly, the present disclosure provides a system that detects a person within an environment, such as a vehicle, and determines if that person is involved in distracting activities such as using a cellular phone, portable electronic device or print media, or if that person is using personal protective equipment. Image information detected by the camera may be compared with prerecorded images of cellular phones, portable electronic devices or print media, or of personal protective equipment, that is stored in computer readable memory and the determination of whether the person is using a cellular phone, portable electronic device, print media or personal protective equipment may be based on the comparison. Moreover, the system may issue an alai iii signal if it has determined that the person is using a cellular phone, portable electronic device or print media, or that the person is not using personal protective equipment.

In one aspect, the present disclosure provides a monitoring system that includes a camera for detecting a person within an environment and a processor which receives information detected by the camera and determines whether the person is involved in distracting activities such as using a cellular phone, other portable electronic device or print media based on the received information. The processor is configured to issue an alarm signal upon determining that the person is using a cellular phone, other portable electronic device or print media.

In another aspect, the present disclosure provides a monitoring system that includes a camera for detecting a person within an environment and a processor which receives information detected by the camera and determines whether the person is using personal protective equipment based on the received information. The processor is configured to issue an alarm signal upon determining that the person is not using personal protective equipment.

In a further aspect, the present disclosure provides a method for monitoring the usage of at least one of a cellular phone, other portable electronic device and print media performing the steps of: detecting, with a camera, a person within an environment; transmitting information detected by the camera to a processor; determining, by the processor, whether the person is using a cellular phone, other portable electronic device or print media based on the received information; and issuing an alarm signal upon determining that the person is using a cellular phone, other portable electronic device or print media. The present disclosure provides, in yet another aspect, a method for monitoring the usage of personal protective equipment, performing the steps of: detecting, with a camera, a person within an environment; transmitting information detected by the camera to a processor; determining, by the processor, whether the person is using personal protective equipment based on the received information; and issuing an alarm signal upon determining that the person is not using personal protective equipment.

Moreover, the present disclosure provides an article of manufacture for monitoring if a worker is involved in distracting activities such as the usage of at least one of a cellular phone, other portable electronic device and print media, wherein the article of manufacture is in communication with a camera for detecting a person within an environment, and the article of manufacture includes a processor and a computer readable medium having computer readable code to effect: retrieving information detected by the camera; determining, by the processor, whether the person is using a cellular phone, other portable electronic device or print media based on the received information; and issuing an alarm signal upon determining that the person is involved in distracting activities such as using a cellular phone, other portable electronic device or print media.

In another aspect, the present disclosure provides an article of manufacture for monitoring cellular phone usage, wherein the article of manufacture is in communication with a camera for detecting a person within an environment, and the article of manufacture includes a processor and a computer readable medium having computer readable code to effect: retrieving information detected by the camera; determining, by the processor, whether the person is using personal protective equipment based on the received information; and issuing an alarm signal upon determining that the person is not using personal protective equipment.

The camera may be provided on or within a vehicle and the person is an operator of the vehicle. Alternatively, the camera may be mounted in a stationary location within a working site.

The alarm signal may be a visually displayable signal, or it may be an audible signal.

The processor may be configured to transmit the alarm signal over a wireless network. Moreover, a vehicle location detector may be provided and the processor may be configured to transmit the alarm signal and the location of the vehicle over a wireless network.

In one aspect, computer readable memory may be configured to store information relating to prerecorded images of a cellular phone, other portable electronic device, print media, or personal protective equipment, and the processor determines whether the person is involved in distracting activities such as using a cellular phone, other portable electronic device or print media, or personal protective equipment, by comparing the information detected by the camera with the image information stored in the computer readable memory.

In yet another aspect, computer readable memory may be configured to store predefined location information that defines a virtual boundary and the processor receives information detected by the vehicle location detector, determines whether the vehicle is within said virtual boundary, based on the information detected by the vehicle location detector and the stored predefined location information, and if the vehicle is determined to be within said virtual boundary, the processor determines whether the person is involved in distracting activities such as using a cellular phone, other portable electronic device or print media, or if the person is using personal protective equipment.

Accordingly, an advantage of the present disclosure is to provide a cellular phone and personal protective equipment usage monitoring system and method that can detect whether a person, such as a vehicle operator, is involved in distracting activities such as using a cellular phone, other portable electronic device or print media, or is using personal protective equipment. Furthermore, an advantage of the present disclosure is to provide an alarm signal when the person is determined to be involved in distracting activities such as using a cellular phone, other portable electronic device or print media, or not using the appropriate personal protective equipment. An additional advantage of the present disclosure is that the alarm signal may be transmitted over a wireless network, thereby providing the alarm to office or field supervisors. The location of the vehicle may also be determined and transmitted. Still further objects and advantages will become apparent from the detailed description and accompanying drawings.

The features, functions and advantages that have been discussed can be achieved independently in various embodiments of the present disclosure or may be combined in yet other embodiments, further details of which can be seen with reference to the following descriptions and drawings.

BRIEF DESCRIPTION OF THE DRAWINGS

Further features and advantages of the invention will be seen from the following detailed description, taken in conjunction with the accompanying drawings, wherein like numerals depict like parts, and wherein.

DETAILED DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Many embodiments of the invention may take the form of computer-executable instructions, including algorithms executed by a programmable computer. Those skilled in the relevant art will appreciate that the invention can be practiced with other computer system configurations as well. Certain aspects of the invention can be embodied in a special-purpose computer or data processor that is specifically programmed, configured or constructed to perform one or more of the computer-executable algorithms described below. Accordingly, the term "computer" as generally used herein refers to any data processor and includes Internet appliances, hand-held devices (including palm-top computers, wearable computers, cellular or mobile phones, multiprocessor systems, processor-based or programmable consumer electronics, network computers, minicomputers) and the like.

The invention can also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic and optically readable and removable computer disks, as well as distributed electronically over networks. Data structures and transmissions of data particular to aspects of the invention are also encompassed within the scope of the invention.

Figure 1:
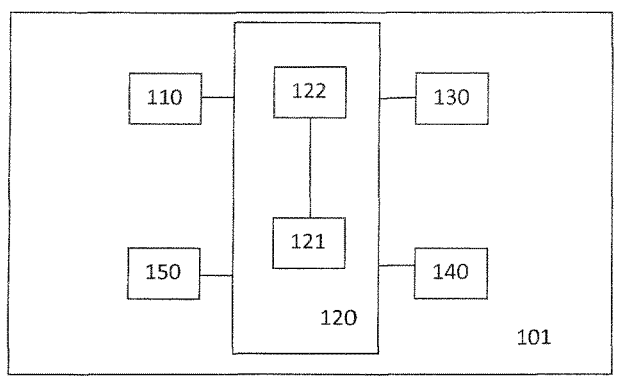
FIG. 1 is a schematic representation of a cellular phone and personal protective equipment usage monitoring system in accordance with one aspect provided by the present disclosure.

FIG. 1 schematically illustrates a primary example of a cellular phone and personal protective equipment usage monitoring system 100 provided by this disclosure. A camera 110 is provided onboard the vehicle 101 and is situated in such a manner as to detect the operator's face. The camera 110 may further be configured to detect postural adjustments, face pose and gaze, shoulder or arm motions, and to track the motion of the operator's eyes. The camera 110 may be mounted, for example, on the vehicle dashboard, rearview mirror, sun visor or any other suitable location on or within the vehicle 101.

The camera may be a video camera, an infrared (IR) illuminated camera, a CCD scanning device, or any other suitable scanning system. An IR illuminated camera provides infrared illumination which allows the camera to detect features even in dark conditions, such as in an underground mine or nighttime conditions in an open pit mine. IR cameras are effective in applications with background light and in both bright and dark environments.

The vehicle 101 is also provided with an onboard computer 120. The onboard computer 120 includes computer readable memory 121, and a processor 122. A display 140 and I/O devices 130 may be connected to the onboard computer 120, thereby allowing a user and/or peripherals to communicate with the onboard computer 120.

In one aspect of the cellular phone and personal protective equipment usage monitoring system 100 provided by this disclosure, images of people using a cellular phone and images of people using personal protective equipment are previously recorded and the image data is stored in a database in memory 121 on the onboard computer 120. Furthermore, images of people using other portable electronic devices, such as various types of communication devices, video game devices, portable audio and video media players and laptops and other portable computers, may be previously recorded and the image data can be stored in memory 121 on the onboard computer 120. Additionally, images of people using various types of printed media, including books, magazines, newspapers, crossword puzzles and the like, may be previously recorded and the image data may be stored in memory 121 on the onboard computer 120. The prerecorded images may include images of people using cellular phones, other portable electronic devices, and print media, and images of people using or wearing personal protective equipment such as indicating equipment (toxic gas and oxygen indicators, combustible gas indicators, etc.), respirators, protective clothing, hard hats and other head protection, eye and face protection and hearing protection equipment. Respirators may be of a type that is worn over the entire face or over a person's nose and mouth, and may be particulate, gas/vapor, air-supplied, self-contained breathing apparatus or combination-type respirators. Protective clothing may include protective clothing that covers a person's head, face, and/or body. Eye protection equipment may include safety glasses, goggles, face shields and the like. Hearing protection equipment may include acoustic earmuffs as well as other known hearing protection devices. The database of prerecorded images includes images of people using these different types of objects (i.e. cellular phones, other portable electronic devices, print media and personal protective equipment) taken from an angle and distance from a camera that matches the view angle and distance that would normally capture images of a vehicle operator's face when the vehicle operator is operating the vehicle, depending on the mounting location of the camera 110. In operation, the processor 122 receives information detected by the camera 110 and determines whether the vehicle operator is using a cellular phone, other portable electronic devices or print media, or wearing personal protective equipment based on a comparison of the information detected by the camera 102 with the information stored in memory 121. The images of the vehicle operator are sent to the processor 122 which executes an algorithm to compare the information received from the camera 110 with the prerecorded images of vehicle operators using cellular phones, other portable electronic devices, print media and personal protective equipment that are stored in memory 121. When an image detected by the camera 102 matches an image stored in memory 121, the processor 122 can determine if the vehicle operator is using a cellular phone, other portable electronic devices or print media, or using the proper personal protective equipment. For example, if the camera detects a vehicle operator using a cellular phone, e.g., holding the phone to his ear, the processor 122 will execute a comparison algorithm to compare the detected image with the prerecorded images stored onboard the computer. The detected image will match with an image of a person using a cellular phone stored in memory 121, and the processor 122 may then determine that the vehicle operator is using a cellular phone.

As a further example, if the camera detects a vehicle operator's face without a respirator, the detected image will not match with an image of a person that is using a respirator stored in memory 121, and the processor 122 may then determine that the vehicle operator is not using a respirator. Alternatively, the detected image may be compared with an image stored in memory 121 of a person that is not wearing a respirator. Upon comparison, the detected image will match the image of a person that is not wearing a respirator and the processor 122 may then determine that the vehicle operator is not using a respirator. On the other hand, if the vehicle operator is wearing a respirator, the detected image will match with an image of a person wearing a respirator and will not match with an image of a person that is not wearing a respirator.

Similarly, if the camera detects a vehicle operator that is not wearing acoustic earmuffs, the detected image will not match with an image of a person that is using acoustic earmuffs stored in memory 121, and the processor 122 may then determine that the vehicle operator is not using acoustic earmuffs. Alternatively, the detected image may be compared with an image stored in memory 121 of a person that is not wearing acoustic earmuffs. Upon comparison, the detected image will match the image of a person that is not wearing acoustic earmuffs and the processor 122 may then determine that the vehicle operator is not using acoustic earmuffs. On the other hand, if the vehicle operator is wearing acoustic earmuffs, the detected image will match with an image of a person wearing acoustic earmuffs and will not match with an image of a person that is not wearing acoustic earmuffs.

As described in the preceding examples, the processor may be configured to determine whether or not a person is using a cellular phone, other portable electronic devices or print media, or personal protective equipment based on the presence of a matching image or based on a lack of a matching image.

The system may be modified depending on the type of safety equipment to be detected. That is, if it is desirable that vehicle operators use a particular type of protective equipment while operating a vehicle, the database may be composed of prerecorded images of that particular type of protective equipment. If multiple types of protective equipment should be worn, multiple databases may be configured with each database containing images of a particular type of protective equipment, and detected images may be compared with images from each database to determine whether the vehicle operator is using each of the multiple types of protective equipment.

In another aspect provided by this disclosure, known template and pattern matching techniques may further be employed with the present invention to determine the presence of a cellular phone, other portable electronic devices, print media or personal protective equipment in an image detected by the camera 110. Furthermore, other known computer vision object recognition techniques may be utilized to detect and recognize such objects. For example, known appearance based object recognition techniques may be employed, including edge matching, grayscale matching and gradient matching techniques, to detect and recognize the presence of certain objects in an image, including a cellular phone, other portable electronic devices, print media or personal protective equipment such as indicating equipment (toxic gas and oxygen indicators, combustible gas indicators, etc.), respirators, protective clothing, hard hats and other head protection, eye and face protection and hearing protection equipment.

Furthermore, the use of a cellular phone, other portable electronic device and print media may be determined based on the behavior of the vehicle operator's eyes, as detected by the camera. Cellular phones and other portable electronic devices are commonly equipped with various capabilities which, when used while operating a vehicle, may distract a vehicle operator and cause a decrease in awareness and increase the risk of an accident. For example, cellular phones and other portable electronic devices can be used to compose and transmit text messages, play games, surf the Internet, read electronic books or other textually-displayed information, play audio and video media, as well as various other potentially distracting uses. When a vehicle operator uses a cellular phone for one of these potentially distracting uses, for example to compose a text message or surf the Internet, such use can be detected because the vehicle operator will continually look at the phone, or will alternate between looking at the phone (usually in a downward or side direction) and looking forward at the road. Similarly, the use of other portable electronic devices, and even print media, can be determined based on the detected movements of the vehicle operator, including the movements of the vehicle operator's eyes.

Thus, the use of a cellular phone or other portable electronic device to compose a text message, play games, surf the Internet, read electronic books or other textually-displayed information, listen to music or other audio media, watch movies or other video media, as well as other potentially distracting uses may be detected, for instance, if the operator's eyes are directed downward for more than a quick transitory glance, or if the eyes are repeatedly directed downward over a short period of time. Detection of the use of a cellular phone or other portable electronic device in a distracting or unsafe manner, including those activities mentioned above, may further be aided by detecting the operator's body movements, such as shoulder or arm motions that may generally indicate that the operator is composing a text message. Similarly, the use of print media, for example reading a book or a magazine, or doing a crossword, can be determined based on the detected movements of the vehicle operator, as discussed above.

If the processor 172 determines that the vehicle operator is using a cellular phone, other portable electronic device or print media, or is not using the appropriate protective equipment, an alarm signal may be transmitted to the vehicle operator. The alarm signal may be issued by the processor 122 and may be output through speakers in the vehicle cab and/or may be visually displayed by the display 140.

A different alarm signal may be output depending on whether the vehicle operator is determined to be using a cellular phone, other portable electronic device or print media, or whether the vehicle operator is determined to not be using personal protective equipment. Moreover, a different alarm signal may be output for each type of personal protective equipment that the vehicle operator is determined to not be using. For example, a distinctive alarm may be issued when the processor 122 has determined that the vehicle operator is using a cellular phone. A different distinctive alarm may be issued when the processor 122 has determined that the vehicle operator is not wearing a particular type of protective equipment. Each type of protective equipment may have an associated distinctive alarm. The issued alarm may be an audible tone or a voice outputted from the speakers that directs the operator to not use the cellular phone, use the appropriate personal protective equipment, or to take some other safety-related action. Furthermore, the alarm may be displayed visually on the display 220 on the onboard computer 200 in the form of text, an icon or an image that identifies the cause of the alarm, i.e. whether the alarm is issued for the use of a cellular phone, other portable electronic device or print media, or for a particular type of protective equipment that is not used.

In another aspect, the vehicle 101 may further be provided with a vehicle location detector 150. The vehicle location detector 150 may utilize any of a number of known location detection techniques, including Global Positioning Systems (GPS) and inertial navigation systems, to detect the location of the vehicle 101. Thus, by using GPS or other location determining technologies, the location of the vehicle may be determined.

Certain areas in a working site such as an underground or open pit mining site, within which particular personal protective equipment should be or is required to be used, may be predefined based on, for example, GPS coordinates. As such, a number of virtual boundaries may be predefined, and their locations may be stored in memory 121 in the onboard computer 120. When the vehicle 101 enters such a virtual boundary, the processor 122 may determine, based on the boundary location stored in memory 121 and the current vehicle location provided by the vehicle location detector 150, that the vehicle 101 has entered, or is about to enter, such a boundary. The processor 122 may then begin the process of determining whether the vehicle operator is using the particular personal protective equipment required for the particular predefined area. Thus, in areas where personal protective equipment is not required, the processor 122 does not need to determine whether or not the vehicle operator is using personal protective equipment. Moreover, in those areas where only a specific type of personal protective equipment is required to be used by the vehicle operator, the processor 122 may limit its comparison search to the database containing images of that particular type of protective equipment.

Figure 2:
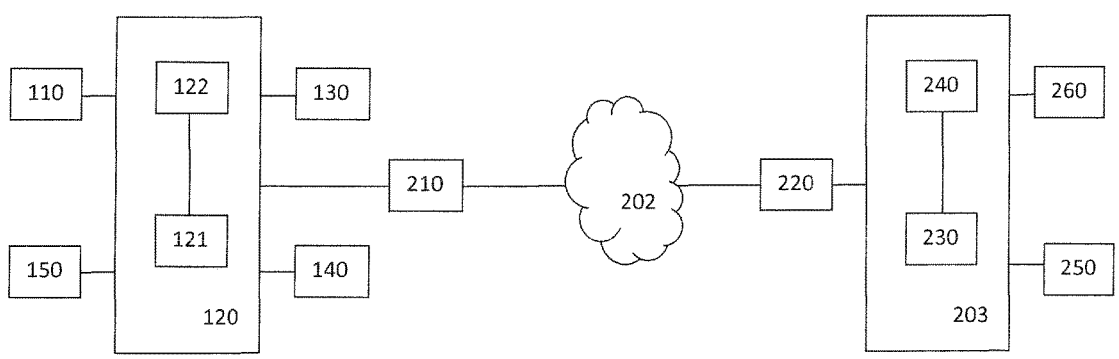
FIG. 2 is a schematic representation of a cellular phone and personal protective equipment usage monitoring system in accordance with a further aspect provided by the present disclosure.

FIG. 2 schematically illustrates further details of the cellular phone and personal protective equipment usage monitoring system 100 of the present disclosure. The camera 110, onboard computer 120 with processor 122 and memory 121, display 140, location detector 150, and I/O devices 130 are provided on vehicle 101 and operate in the same manner as discussed above in relation to FIG. 1. A wireless communication device 210 is further included onboard the vehicle 101. The wireless communication device 210 communicates with a central computer 203 through a wireless network 202.

The central computer 203 includes computer readable memory 230, and a processor 240. The central computer 203 communicates with wireless communication device 220, thereby enabling communication between the central computer 203 and other devices through wireless network 202. A display 250 and I/O devices 260 may be connected to the central computer 203, thereby allowing a user and/or peripherals to communicate with the central computer 203. The central computer 203 may be a central server, which may be accessible to other computer terminals through a wired or wireless network.

The detection of personal protective equipment and cellular phone, other portable electronic device or print media use, may be accomplished as described above with respect to FIG. 1, and the alarm indicating that the vehicle operator is using a cellular phone, other portable electronic device or print media, or is not using the proper personal protective equipment, may be sent through the wireless network 202 to the central computer 203 and may thus be output or displayed as an audible or visual warning. Furthermore, the location of the vehicle 101 and the particular cause of the alarm (e.g. the operator is using a cellular phone, is not wearing the required acoustic earmuffs, etc.) may be transmitted to the central computer 203.

Wireless communication devices 210, 220 enable communication between the central computer 203 and the onboard computer 120. The wireless communication devices 210, 220 may be located with or within the central computer 203, with or within the vehicle 101, and/or at other points local to a working site, such as an underground or open pit mining site. The wireless network 202 may be any type of wireless computer network that enables communication between devices, for example Wireless LAN, Wi-Fi, mobile device networks, and/or 3G communications protocols.

Providing the central computer 203 with an alarm indicating that the vehicle operator is using a cellular phone, other portable electronic device or print media, or is not using the proper personal protective equipment allows a user of the central computer 203 to better monitor the safety of the vehicle operator, as well as the safety of an operation, such as an underground or open pit mining operation. Additionally, providing the central computer 203 with the location of the vehicle 101 and the cause of the alarm allows a user of the central computer 203 to better monitor safety and to know the location of the vehicle 101 and vehicle operator. Furthermore, other users, such as field supervisors, may carry wireless communication devices that may be configured to receive the issued alarms, as well as the cause of the alarm and the location of the vehicle 101, through the wireless network 202.

The central computer 203 may further include a computer displayable map of the environment, such as an underground or open pit mine, on which the locations of the vehicles and any associated alarms may be displayed.

In yet a further aspect, the present disclosure provides a cellular phone and personal protective equipment usage monitoring system that operates in the same way as described above, with reference to FIGS. 1 and 2, except the camera 110 is provided in a stationary location within a working site instead of onboard a vehicle. For instance, the camera may be mounted on a pole, or other stationary structure, within an underground or open pit mining site. Moreover, a plurality of cameras may be provided within the working site. The camera 110 may be situated in such a manner as to capture images of working personnel within the site.

Images detected by the camera 110 are transmitted over a wireless network 202, where they are received by a central computer 203. The processor 240 may then employ any of the techniques described throughout this disclosure for determining whether the working personnel is using a cellular phone, other portable electronic device or print media, or personal protective equipment, including comparing the received images with image information stored in memory 230. When the processor 240 determines that the person is using a cellular phone, other portable electronic device or print media, or is not using a particular required piece of protective equipment, an alarm may be issued which is output or displayed, audibly or visually, such that a user of the computer may become aware of the unsafe condition.

While the cellular phone and personal protective equipment usage monitoring system of the present disclosure has been described primarily in reference to a single vehicle, a plurality of vehicles may be included in the system, with each vehicle provided with a camera to detect objects as described above.

The system may be implemented in software or firmware that is stored in a memory and that is executed by a suitable instruction execution system. If implemented in computer hardware, the system can be implemented, for example, with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The system may be implemented in software, as an executable program, and is executed by a processor within a special or general-purpose digital computer, such as a personal computer (PC; IBM-compatible, Apple-compatible, or otherwise), workstation, minicomputer, mainframe computer, handheld computer or a personal data assistant (PDA). A processor is a hardware device for executing software, particularly that stored in computer memory.

Various changes may be made in the above disclosure. For example, the system may include a memory for temporarily storing images. In order to minimize storage, if no alarms are triggered, the memory may be set to purge automatically after a period of time which could be minutes, hours or days. On the other hand, if an alarm is triggered, the memory would save images surrounding the alarm. These saved images may be useful in accident reconstruction and/or worker discipline or worker training. Still other changes may be made without departing the spirit and scope of the disclosure.

What is claimed is:

1. A driver operated vehicle monitoring system comprising:
    a camera provided on or within the vehicle for detecting images of the driver within the vehicle;
    a processor provided on or within the vehicle which receives information detected by the camera and determines whether the driver is involved in distracting activities based on the received information wherein the distracting activities are selected from the group consisting of using a cellular phone, another portable device, and reading print media; and
    computer readable memory provided on or within the vehicle configured to store information relating to prerecorded images of a person holding a cellular phone to an ear, the eyes of a person using another portable electronic device, and the eyes of a person reading print media,
    wherein said processor compares images of the driver's ear and eyes and said stored information to determine during operation of the vehicle whether the driver is using a cellular phone, another portable electronic device, and reading print media, and
    wherein the processor is configured to issue an alarm signal upon determining that the driver is using at least one of a cellular phone, another portable electronic device, and reading print media.

2. The system of claim 1, wherein the alarm signal is a visually displayable signal.

3. The system of claim 1, wherein the alarm signal is an audible signal.

4. The system of claim 1, wherein the processor is configured to transmit the alarm signal over a wireless network.

5. The system of claim 1, further comprising a vehicle location detector, wherein the processor is configured to transmit the alarm signal and the location of the vehicle over a wireless network.

6. The system of claim 1 further comprising:
    a vehicle location detector; and
    computer readable memory configured to store predefined location information, said predefined location information defining a virtual boundary,
    wherein the processor receives information detected by the vehicle location detector, determines whether the vehicle is within said virtual boundary, based on the information detected by the vehicle location detector and the stored predefined location information, and if the vehicle is determined to be within said virtual boundary, the processor determines whether the person is using a cellular phone, other portable electronic device or print media.

7. The system of claim 1, further comprising a memory for recording images of the driver when an alarm signal is issued.

8. A method for monitoring the usage by a driver within a vehicle of at least one of a cellular phone, other portable electronic device and print media, comprising the steps of:
    detecting, with a camera provided on or within the vehicle, images of the driver's ears and eyes within the vehicle;
    transmitting information detected by the camera to a processor provided on or within the vehicle;
    storing information relating to prerecorded images of a person holding a cellular phone to an ear, the eyes of a person using another portable electronic device, and the eyes of a person reading print media, in computer readable memory provided on or within the vehicle;
    determining, by the processor and during operation of the vehicle, whether the driver is using at least one of a cellular phone, other portable electronic device, and print media by comparing images of the driver's ears and eyes with the prerecorded image information; and
    issuing an alarm signal upon determining that the driver is using at least one of a cellular phone, another portable electronic device, and reading print media.

9. The method of claim 8, wherein the alarm signal is a visually displayable signal.

10. The method of claim 8, wherein the alarm signal is an audible signal.

11. The method of claim 8, wherein the processor is configured to transmit the alarm signal over a wireless network.

12. The method of claim 8, further comprising the steps of:
    detecting the location of the vehicle; and
    transmitting the alarm signal and the location of the vehicle over a wireless network.

13. The method of claim 8, further comprising the steps of:
    detecting the location of the vehicle;

storing predefined location information in computer readable memory, said predefined location information defining a virtual boundary;

transmitting the detected vehicle location to the processor; and determining, by the processor, whether the vehicle is within said virtual boundary, based on the detected vehicle location and the stored predefined location information, wherein the processor determines whether the person is using a cellular phone, other portable electronic device or print media if the vehicle is determined to be within said virtual boundary.

14. The method of claim 8, including storing images of the driver when an alarm signal is issued.

15. An article of manufacture for monitoring the usage by a driver within a vehicle of at least one of a cellular phone, other portable electronic device and print media, wherein the article of manufacture is in communication with a camera provided on or within the vehicle for detecting images of the driver's ears or eyes within the vehicle, said article of manufacture comprising a processor provided on or within the vehicle with a computer readable medium having computer readable code to effect:

retrieving images of the driver detected by the camera;

storing information relating to prerecorded images of a person holding a cellular phone to an ear, the eyes of a person using another portable electronic device, and the eyes of a person reading print media, in computer readable memory;

comparing, by the processor and during operation of the vehicle, images of the driver's eyes or ear detected by the camera with the prerecorded image information to determine whether the driver is using a cellular phone, another portable electronic device, and reading print media; and issuing an alarm signal upon determining that the driver is using at least one of a cellular phone, another portable electronic device, and reading print media.

16. The article of manufacture of claim 15, wherein the computer readable code further comprises a computer readable program step of:

transmitting the alarm signal over a wireless network.

17. The article of manufacture of claim 15, wherein said article of manufacture further is in communication with a location detector for detecting the location of said vehicle, wherein the computer readable code further comprises a computer readable program step of:

transmitting the alarm signal and the location of the vehicle over a wireless network.

18. The article of manufacture of claim 15, wherein the computer readable code further comprises a computer readable program step of:

storing images of the driver when an alarm signal is issued.

* * * * *